(12) United States Patent
Choi et al.

(10) Patent No.: US 9,867,164 B2
(45) Date of Patent: Jan. 9, 2018

(54) METHOD AND DEVICE FOR PROCESSING A SPECIFIC REQUEST MESSAGE IN WIRELESS COMMUNICATION SYSTEM

(71) Applicant: LG ELECTRONICS INC., Seoul (KR)

(72) Inventors: Heedong Choi, Seoul (KR); Seungkyu Park, Seoul (KR); Seongyun Kim, Seoul (KR); Hongbeom Ahn, Seoul (KR); Seungmyeong Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 140 days.

(21) Appl. No.: 14/912,837

(22) PCT Filed: Sep. 11, 2014

(86) PCT No.: PCT/KR2014/008465
§ 371 (c)(1),
(2) Date: Feb. 18, 2016

(87) PCT Pub. No.: WO2015/034337
PCT Pub. Date: Mar. 12, 2015

(65) Prior Publication Data
US 2016/0212732 A1    Jul. 21, 2016

Related U.S. Application Data

(60) Provisional application No. 61/875,680, filed on Sep. 9, 2013, provisional application No. 62/038,373, filed on Aug. 18, 2014.

(51) Int. Cl.
*H04W 72/04* (2009.01)
*H04W 4/00* (2009.01)
(Continued)

(52) U.S. Cl.
CPC .......... *H04W 72/04* (2013.01); *H04W 4/005* (2013.01); *H04L 67/2814* (2013.01);
(Continued)

(58) Field of Classification Search
None
See application file for complete search history.

(56) References Cited

U.S. PATENT DOCUMENTS 4,914,571 A * 4/1990 Baratz ..................... H04L 29/00
7,882,501 B1 * 2/2011 Carlson ..................... G06F 8/67
709/203

(Continued)

FOREIGN PATENT DOCUMENTS

KR    10-2011-0117030 A    10/2011
KR    10-2013-0064217 A    6/2013
(Continued)

*Primary Examiner* — Steven H Nguyen
(74) *Attorney, Agent, or Firm* — Birch, Stewart, Kolasch & Birch, LLP

(57) ABSTRACT

According to one embodiment of the present invention, a method for processing a request message in a wireless communication is disclosed, and the method is performed by a first M2M device and comprises the steps of: receiving a request message related to a specific resource type from a second M2M device; determining whether the specific resource type is supported; searching for another M2M device supporting the specific resource type if the specific resource type is not supported; processing the request message so as to transfer the processed request message to a third M2M device if the third M2M device supporting the specific resource type is discovered according to the searched result, wherein an operation related to the request message is performed by the third M2M device instead of the first M2M device; receiving a response message including the processed result of the request message from the (Continued)

other device; and processing the received response message so as to transfer the processed response message to a transmission device.

16 Claims, 9 Drawing Sheets

(51) Int. Cl.
 *H04L 29/08* (2006.01)
 *H04W 92/18* (2009.01)
 *H04W 8/00* (2009.01)

(52) U.S. Cl.
 CPC .......... *H04W 8/005* (2013.01); *H04W 72/042* (2013.01); *H04W 72/0413* (2013.01); *H04W 92/18* (2013.01)

(56) References Cited

U.S. PATENT DOCUMENTS

| | | | |
|---|---|---|---|
| 2009/0147746 A1* | 6/2009 | Alay | H04B 5/02 370/329 |
| 2014/0012939 A1 | 1/2014 | Park et al. | |
| 2014/0064232 A1 | 3/2014 | Chang et al. | |
| 2016/0014831 A1 | 1/2016 | Lee et al. | |
| 2016/0041859 A1* | 2/2016 | Burns | H04L 67/125 714/33 |

FOREIGN PATENT DOCUMENTS

| | | |
|---|---|---|
| WO | WO 2012/124999 A2 | 9/2012 |
| WO | WO 2012/157849 A2 | 11/2012 |
| WO | WO 2013/119094 A1 | 8/2013 |

\* cited by examiner

METHOD AND DEVICE FOR PROCESSING A SPECIFIC REQUEST MESSAGE IN WIRELESS COMMUNICATION SYSTEM

CROSS REFERENCE TO RELATED APPLICATIONS

This application is the National Phase of PCT/KR2014/008465 filed on Sep. 11, 2014, which claims priority under 35 U.S.C. §119(e) to U.S. Provisional Application Nos. 61/875,680 filed on Sep. 9, 2013; and 62/038,373 filed on Aug. 18, 2014, all of which are hereby expressly incorporated by reference into the present application.

TECHNICAL FIELD

The present invention relates to a method and apparatus for processing a specific request message in a wireless communication system.

BACKGROUND ART

M2M (Machine to Machine) communication technology has come into the spotlight with the advent of ubiquitous era. M2M communication technologies have been intensively researched in many Standard Development Organizations (SDOs) such as TIA, ATIS, ETSI, oneM2M, etc. Communication between several M2M associated applications (Network Application/Gateway Application/Device Application) occurs in the M2M environment, the management entity of the M2M server part (e.g., common service entity (CSE)) may be different from the management entity of the network-side application (e.g., network application).

In addition, the M2M related application has capability for providing a specific M2M service, and this capability may be defined as a capability-associated resource.

In the meantime, if a specific M2M device (i.e., a requesting M2M device) requests a specific M2M service from another M2M device (i.e., an M2M device acting as a request receiver), assuming that it is impossible for the above request receiver M2M device to support a specific M2M service, the receiver M2M device transmits a response message for indicating that the above service cannot be supplied to the requesting M2M device, and the corresponding procedure is terminated. However, the termination of such simple procedure is repeated by the requesting M2M device, such that the corresponding request is transmitted to another M2M device (i.e., another requesting receiving M2M device).

As a result, a method for more efficiently providing the specific M2M service request needs to be proposed.

DISCLOSURE

Technical Problem

An object of the present invention is to provide a method for processing a request of a specific M2M service in a wireless communication system.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The objects of the present invention can be achieved by providing a method for processing a request message by a first machine-to-machine (M2M) device in a wireless communication system including: receiving a request message related to a specific resource type from a second M2M device; determining whether the specific resource type is supported; if the specific resource type is not supported, discovering another M2M device supporting the specific resource type; if a third M2M device supporting the specific resource type is discovered according to the discovery result, processing the request message and transmitting the processed request message to the third M2M device, wherein an operation related to the request message is performed by the third M2M device instead of the first M2M device; receiving a response message including a result of processing the request message from the another M2M device; and processing the received response message, and transmitting the processed response message to an originating device.

Additionally or alternatively, the determining whether the specific resource type is supported may include: determining whether the specific resource type is contained in a value of 'supportedResourceType' attribute contained in a <CSEBase> resource.

Additionally or alternatively, the method may further include: prior to the discovering, determining whether the specific resource type is a resource type allowed to be processed in another device other than a device designated by the originating device.

Additionally or alternatively, the discovering may include: determining whether the first M2M device has a specific right for the third M2M device; and if the specific right for the third M2M device is present, determining whether the third M2M device supports the specific resource type.

Additionally or alternatively, the determining whether the first M2M device has a specific right for the third M2M device may include: determining the presence or absence of the specific right based on a first right in which the first M2M device is allowed to read 'supportedResourceType' attribute contained in the resource of the third M2M device or a second right in which the first M2M device is allowed to perform an operation related to the request message to the third M2M device.

Additionally or alternatively, the method may further include: if the third M2M device supporting the specific resource type is discovered according to the discovery result, including the specific resource type in the 'supportedResourceType' attribute contained in <CSEBase> resource.

Additionally or alternatively, the method may further include: if the third M2M device supporting the specific resource type is discovered according to the discovery result, before transmitting the processed request message to the third M2M device, generating a resource having a specific resource type ('unsupportedResourceType').

Additionally or alternatively, the processed request message, the response message, and the processed response message may include information regarding an address of a resource having the specific resource type.

In accordance with another aspect of the present invention, a machine-to-machine (M2M) device configured to process a request message in a wireless communication system includes: a radio frequency (RF) unit; and a processor configured to control the RF unit, wherein the processor receives a request message related to a specific resource type from a second M2M device, determines whether the specific resource type is supported, if the specific resource type is not supported, discovers another M2M device supporting the specific resource type, if a third M2M device supporting the specific resource type is discovered according to the discovery result, processes the request message and transmits the processed request message to the third M2M device, performs an operation related to the request message by the third M2M device instead of the first M2M device; receives a response message including a result of processing the request message from the another M2M device; and processes the received response message, and transmits the processed response message to an originating device.

Additionally or alternatively, the processor may determine whether the specific resource type is contained in a value of 'supportedResourceType' attribute contained in a <CSEBase> resource so as to determine whether the specific resource type is supported.

Additionally or alternatively, the processor, prior to the discovering, may determine whether the specific resource type is a resource type allowed to be processed by another device other than a device designated by the originating device.

Additionally or alternatively, the processor may determine whether the first M2M device has a specific right for the third M2M device; and if the specific right for the third M2M device is present, may determine whether the third M2M device supports the specific resource type.

Additionally or alternatively, whether the first M2M device has a specific right for the third M2M device is determined based on may be determined based on a first right in which the first M2M device is allowed to read 'supportedResourceType' attribute contained in the resource of the third M2M device or a second right in which the first M2M device is allowed to perform the operation related to the request message to the third M2M device.

Additionally or alternatively, if the third M2M device supporting the specific resource type is discovered according to the discovery result, the processor may include the specific resource type in the 'supportedResourceType' attribute contained in a <CSEBase> resource.

Additionally or alternatively, if the third M2M device supporting the specific resource type is discovered according to the discovery result, before transmitting the processed request message to the third M2M device, the processor may generate a resource having a specific resource type ('unsupportedResourceType').

Additionally or alternatively, the processed request message, the response message, and the processed response message include information regarding an address of a resource having the specific resource type.

It is to be understood that both the foregoing general description and the following detailed description of the present invention are exemplary and explanatory and are intended to provide further explanation of the invention as claimed.

Advantageous Effects

According to exemplary embodiments of the present invention, the present invention can enhance efficiency of the specific M2M service request processing in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Reference will now be made in detail to the preferred embodiments of the present invention, examples of which are illustrated in the accompanying drawings. The following detailed description of the invention includes details to aid in full understanding of the present invention. Those skilled in the art will appreciate that the present invention can be implemented without these details.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

In the present disclosure, devices for device-to-device communication, that is, M2M devices, may be fixed or mobile and include devices which communicate with a server for device-to-device communication, that is, an M2M server to transmit/receive user data and/or various types of control information. The M2M devices may be referred to as terminal equipment, mobile stations (MSs), mobile terminals (MTs), user terminals (UTs), subscriber stations (SSs), wireless devices, personal digital assistants (PDA), wireless modems, handheld devices and the like. In the present invention, the M2M server refers to a fixed station which communicates with M2M devices and/or other M2M servers, and exchanges various types of data and control information with M2M devices and/or other M2M servers by communicating with the M2M devices and/or other M2M servers.

A description will be given of technology associated with the present invention.

M2M Applications

These are applications that execute service logic and use a common service entity (CSE) accessible through an open interface. The M2M applications can be installed in an M2M device, an M2M gateway or an M2M server.

M2M Service

This is a set of functions that can be used by the M2M CSE through standardized interfaces.

oneM2M defines a common M2M service framework (or service platform, CSE or the like) for various M2M applications (or application entities (AEs)). M2M applications can be considered as software implementing service logic such as e-Health, City Automation, Connected Consumer and Automotive. The oneM2M service framework includes functions commonly necessary to implement various M2M applications. Accordingly, it is possible to easily implement various M2M applications using the oneM2M service framework without configuring frameworks necessary for the respective M2M applications. This can integrate M2M markets currently divided into many M2M verticals, such as smart building, smart grid, e-Heath, transportation and security, and thus remarkable growth of the M2M markets is expected.

Figure 1:
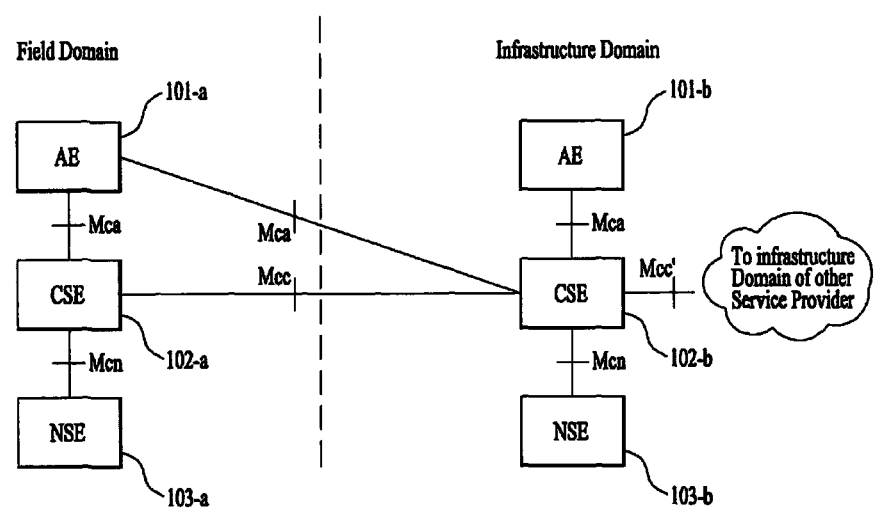
FIG. 1 is a block diagram illustrating a functional structure of an M2M communication system.

FIG. 1 illustrates the architecture of an M2M communication system. Each entity will now be described.

Application entity (AE, 101): Application entity provides application logic for end-to-end M2M solutions. Examples of the application entity include fleet tracking application, remote blood sugar monitoring application, remote power metering and controlling application.

Common service entity (CSE, 102): CSE comprises the set of "service functions" that are common to M2M environments and specified by oneM2M. Such service functions are exposed to AEs and other CSEs through reference points X and Y and used by the AEs and other CSEs. The reference point Z is used for accessing underlying network service entities.

Examples of the service functions provided by the CSE include data management, device management, M2M subscription management and location service. These functions can be logically classified into common service functions (CSFs). Some CSFs in the CSE are mandatory and some may be optional. Further, some functions in the CSFs are mandatory and some functions may be optional (e.g. some of application software installation, firmware update, logging and monitoring functions in "device management" CSF are mandatory functions and some are optional functions.)

Underlying network service entity (NSE, 103): provides services to the CSEs. Examples of such services include device management, location services and device triggering. No particular organization of the NSEs is assumed. Note: underlying networks provide data transport services between entities in the oneM2M system. Such data transport services are not included in the NSE.

The reference points shown in FIG. 1 will now be described.

Mca Reference Point

This is the reference point between an AE and a CSE. The Mca reference point allows the CSE to communicate with the AE such that the AE can use the services provided by the CSE.

The services provided through the Mca reference point are dependent on the functionality supported by the CSE. The AE and the CSE may or may not be co-located within the same physical entity.

Mcc Reference Point

This is the reference point between two CSEs. The Mcc reference point allows a CSE to use the services of another CSE in order to fulfill needed functionality. Accordingly, the Mcc reference point between two CSEs is supported over different M2M physical entities. The services offered via the Mcc reference point are dependent on the functionality supported by the CSEs.

Mcn Reference Point

This is the reference point between a CSE and an NSE. The Mcn reference point allows a CSE to use the services (other than transport and connectivity services) provided by the NSE in order to fulfill the needed functionality. It means services other than simple service such as transport and connectivity, for example, services such as device triggering, small data transmission and positioning.

Mcc' Reference Point

This is the reference point is used for communication between CSEs respectively belongs to different M2M service providers. Mcc' references point is similar to Mcc reference point in respect of connecting CSEs each other, but Mcc' reference point expands Mcc reference point to different M2M service providers while Mcc reference point is limited to communication in a single M2M service provider.

Figure 2:
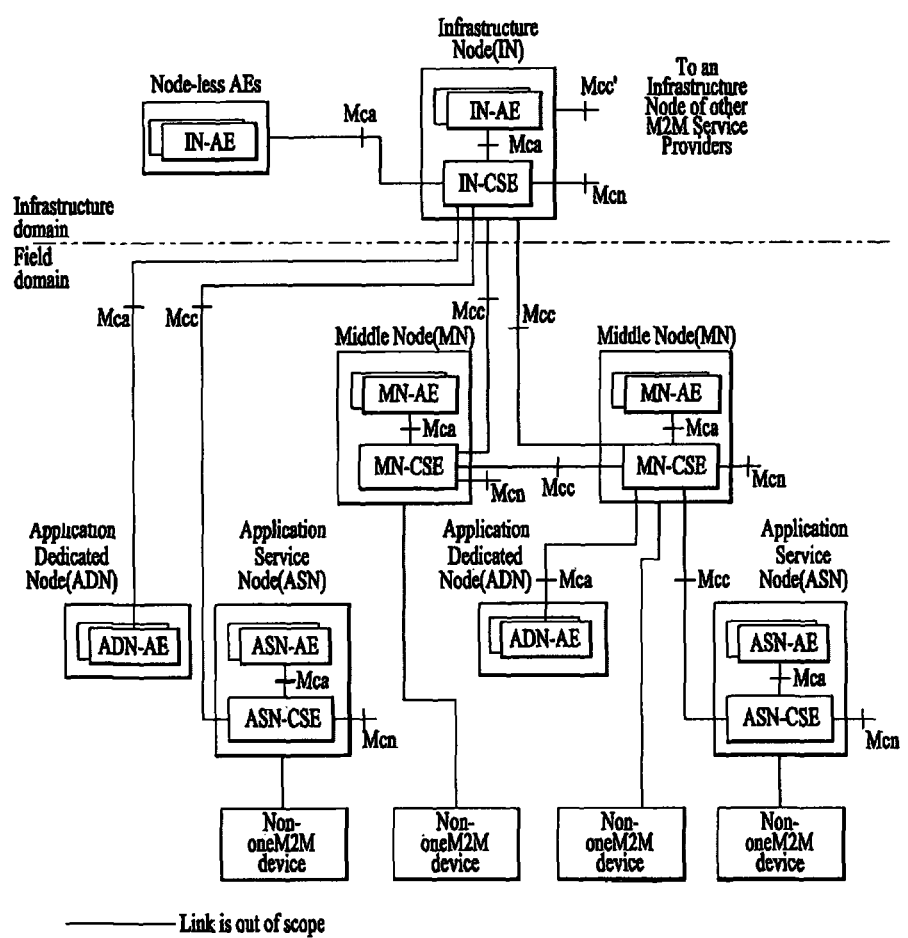
FIG. 2 is a block diagram illustrating constituent elements supported by an M2M communication system on the basis of the M2M functional structure.

FIG. 2 illustrates compositions supported by M2M communication system based on the architecture. The M2M communication system may support more various compositions without being limited to the illustrated compositions. A concept, which is called to node, important for understand the illustrated compositions will be explained.

Application Dedicated Node (ADN): An application dedicated node is a node that contains at least one M2M application and does not contain a CSE. The ADN can communicate over an Mca reference point with one middle node or one infrastructure node. The ADN can be present in an M2M device.

Application Service Node (ASN): An application service node is a node that contains at least one CSE and has at least one M2M application. The ASN can communicate over a Mcc reference point with one middle node or one infrastructure node. The ASN can be present in an M2M device.

Middle Node (MN): A middle node is a node that contains at least one CSE and may contain M2M applications. The middle node communicates over a Mcc references point with at least two nodes belonging to the following different category:
one or more ASNs;
one or more middle nodes (MNs); and
one infrastructure structure.

The MN can be connected with the ADN through an Mca reference point. The MN can be present in an M2M gateway.

Infrastructure Node (IN): An infrastructure node is a node that contains one CSE and may contain application entities (AEs). The IN can be present in M2M server.

The IN communicates over a Mcc reference point with either:
one or more middle nodes; and/or
one or more application service nodes.

The IN may communicate with one or more ADNs over one or more Mca reference points.

Figure 3:
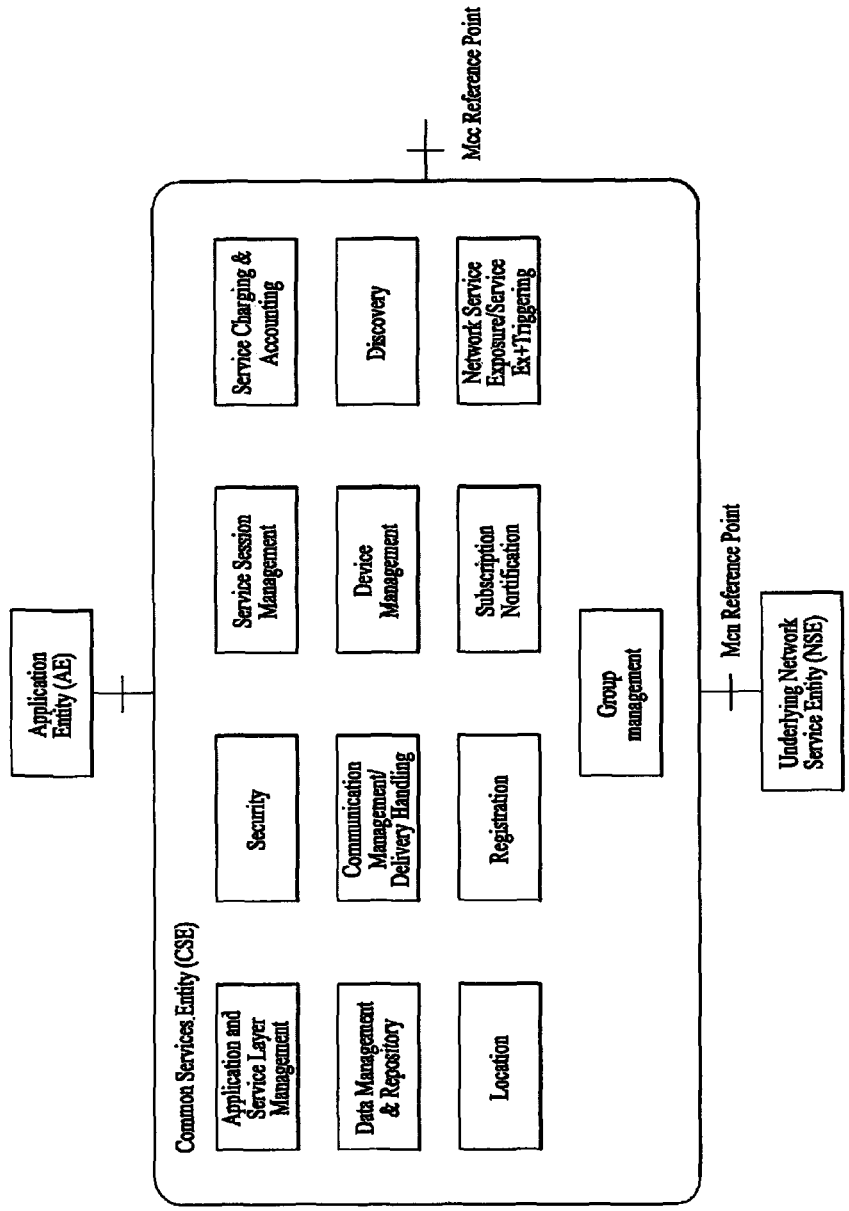
FIG. 3 is a conceptual diagram illustrating a communication service function supplied from the M2M communication system.

FIG. 3 illustrates M2M service functions in the M2M communication system.

M2M service functions (i.e. common service functions) provided by the oneM2M service framework include "Communication Management and Delivery Handling", "Data Management and Repository", "Device Management", "Discovery", "Group Management", "Addressing and Identification", "Location", "Network Service Exposure, Service Execution and Triggering", "Registration", "Security", "Service Charging and Accounting", "Session Management" and "Subscription and Notification.", as shown in FIG. 3.

A brief description will be given of each M2M service function.

Communication Management and Delivery Handling (CMDH): this provides communications with other CSEs, AEs and NSEs and delivers messages.

Data Management and Repository (DMR): this enables M2M applications to exchange and share data.

Device Management (DMG): this manages M2M devices/gateways. Specifically, the device management function includes installation and setting of applications, determination of set values, firmware update, logging, monitoring, diagnostics, topology management, etc.

Discovery (DIS): this discovers resources and information based on conditions.

Group Management (GMG): this processes a request related to a group that may be generated by grouping resources, M2M devices or gateways.

Addressing and Identification (AID): this identifies and addresses physical or logical resources.

Location (LOC): this enables M2M applications to obtain position information of an M2M device or gateway.

Network Service Exposure, Service Execution and Triggering (NSE): this enables communication of an underlying network and use of functions provided by the underlying network.

Registration (REG): this handles registration of an M2M application or another CSE with a specific CSE. Registration is performed in order to use M2M service functions of the specific CSE.

Security (SEC): this performs handling of sensitive data such as a security key, association establishment, authentication, authorization, identity protection, etc.

Service Charging and Accounting (SCA): this provides a charging function to CSEs.

Session Management (SM): this manages an M2M session for end-to-end communication.

Subscription and Notification (SUB): this notifies change of a specific resource when the change of the specific resource is subscribed.

The M2M service functions are provided through CSE, and AE (or, M2M applications) may use through Mca reference point, or other CSE may use the M2M service functions through Mcc reference point. Also, the M2M service functions may be operated synchronized with underlying network (or underlying network service entity (NSE) such as 3GPP, 3GPP2, Wi-Fi, Bluetooth).

All oneM2M devices/gateways/infrastructures do not have higher functions and may have mandatory functions and some optional functions from among the corresponding functions.

The term "resource" in the M2M communication system may be used to construct and express information in the M2M communication system, and may indicate all kinds of things capable of being identified by URI. The resource may be classified into a general resource, a virtual resource, and an announced resource. Respective resources can be defined as follows.

Virtual Resource: The virtual resource may trigger specific processing, and/or may perform retrieving of the result. The virtual resource is not permanently contained in CSE.

Announced Resource: The announced resource is a resource contained in the resource CSE connected to the announced (or notified) original resource. The announced resource may maintain some parts of the characteristics of the original resource. The resource announcement may facilitate the resource searching or discovery. The announced resource contained in the remote CSE is not present as a child of the original resource in the remote CSE, or may be used to generate child resources instead of the announced child of the original resource.

General resource: If this resource is not designated as the virtual or announced resource, the corresponding resource is a general resource.

Figure 4:
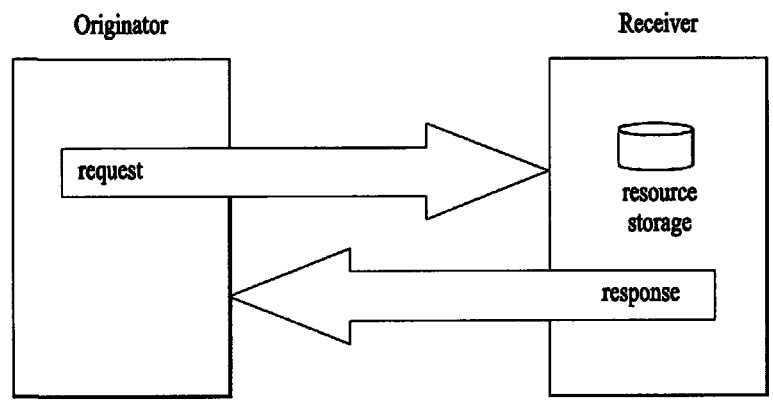
FIG. 4 is a conceptual diagram illustrating a method for transmitting and receiving the request and response messages used in the M2M communication system.

FIG. 4 is a conceptual diagram illustrating a general communication flow located at Mca and Mcc reference points. The M2M system operation is carried out on the basis of data exchanging. For example, in order to allow a first device to transmit or perform a command for stopping a specific operation of a second device, the first device must transmit the corresponding command (configured in a data form) to the second device. In the M2M system, data can be exchanged using the request and response messages during communication between the application (or CSE) and another CSE.

The request message may include the following information.

op: "op" means the shape of an operation to be carried out. (This information may be selected from among Create, Retrieve, Update, Delete, and Notify.)

to: "to" means an ID (i.e., ID of the receiver) of an entity scheduled to receive the request.

fr: "fr" means an ID of a calling user (i.e., call originator) who generates the request.

ri: "ri" means an ID (i.e., ID used to discriminate the request message) of the request message mi: "mi" means additional information (i.e., meta information) regarding the corresponding request.

cn: "cn" means content of resources to be transmitted.

The response message may include the following information. If the corresponding request message is successfully processed, the response message may include the following information.

to: "to" means an ID of a calling user (i.e., a call originator) who generates the request message.

fr: "fr" means an ID of a called person (i.e., a call receiver) who receives the request message.

ri: "ri" means an ID of the request message used to identify the ID of the request message.

mi: "mi" means additional information (i.e., meta information) regarding the corresponding request.

rs: "rs" means the processed result (for example, Okay, Okay and Done, Okay and in progress) of the request message.

ai: "ai" means additional information.

cn: "cn" means content of resources to be transmitted (only the resultant value (rs) can be transmitted.)

If the request message processing is failed, the response message may include the following information.

to: "to" means an ID of a calling user (i.e., a call originator) who generates the request message.

fr: "fr" means an ID of a called person (i.e., a call receiver) who receives the request message.

ri: "ri" means an ID of the request message (so as to identify the ID of the request message).

mi: "mi" means additional information (i.e., meta information) regarding the corresponding request.

rs: "rs" means the processed result (for example, Not Okay) of the request message.

ai: "ai" means additional information.

As described above, the response message may include the above-mentioned information.

Figure 5:
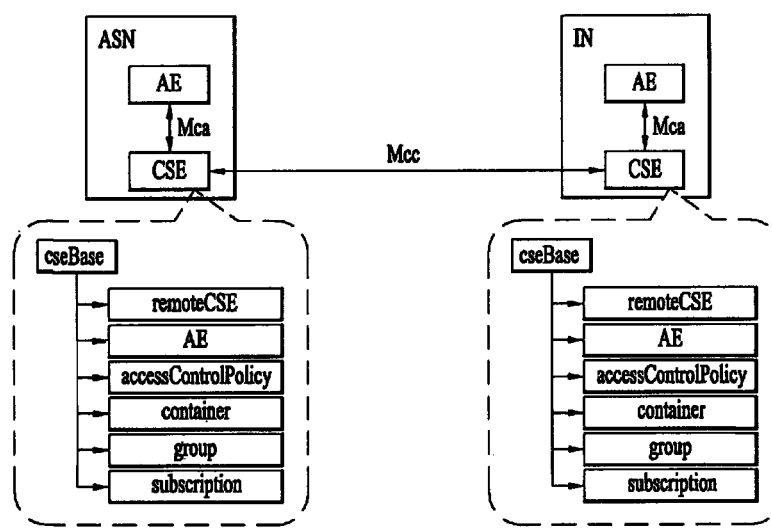
FIG. 5 is a conceptual diagram illustrating resource structures present in the M2M application service node and the M2M infrastructure node.

FIG. 5 illustrates structures of resources present in an M2M application service node and an M2M infrastructure node.

The M2M architecture defines various resources. M2M services for registering applications and reading sensor values can be performed by operating the resources. The resources are configured in one tree structure and may be logically connected to the CSE or stored in the CSE to be stored in M2M devices, M2M gateways, network domains and the like. Accordingly, the CSE can be referred to as an entity that manages resources. The resources have a <cseBase> as a tree root. Representative resources are described below.

<cseBase> resource: this is a root resource of oneM2M resources configured in a tree and includes all other resources.

<remoteCSE> resource: this belongs to <cseBase> resource and includes information on other CSE being connected or registered to corresponding CSE.

<AE> resource: this is a resource that is lower than <cseBase> or <remoteCSE> resource, and stores information on applications registered (connected) with the corresponding CSE when present under <cseBase> resource, and stores information on applications registered with other CSEs (in the name of CSE) when present under <remoteCSE> resource.

<accessControlPolicy> resource: this stores information associated with access rights to specific resources. Authentication is performed using access rights information included in this resource.

<container> resource: this is a resource that is lower than containers and stores data per CSE or AE.

<group> resource: this is a resource that is lower than groups and provides a function of grouping a plurality of resources and simultaneously processing the grouped resources.

<subscription> resource: this is a resource that is lower than subscriptions and executes a function of announcing a state change such as a resource value change through notification.

Figure 6:
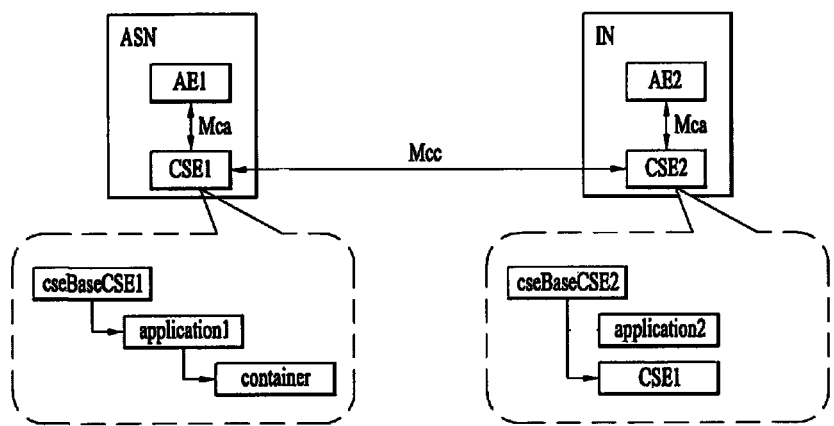
FIG. 6 is a conceptual diagram illustrating resource structures present in the M2M application service node (e.g., M2M device) and the M2M infrastructure node.

FIG. 6 illustrates structures of resources present in an M2M application service node (e.g. M2M device) and an M2M infrastructure node.

A description will be given of a method by which an AE (application 2) registered with the M2M infrastructure node reads a value of a sensor of the M2M device. The sensor refers to a physical device, in general. An AE (application 1) present in the M2M device reads a value from the sensor and stores the read value in the form of a container resource in a CSE (CSE 1) in which the AE (application 1) has registered. To this end, the AE present in the M2M device needs to be pre-registered with the CSE present in the M2M device. Upon completion of registration, registered M2M application related information is stored in the form of cseBaseCSE1/application1 resource, as shown in FIG. 5.

When the sensor value is stored, by the AE present in the M2M device, in a container resource lower than the cseBaseCSE1/application1 resource, the AE registered with the infrastructure node can access the corresponding value. To enable access, the AE registered with the infrastructure node also needs to be registered with a CSE (CSE 2) of the infrastructure node. Registration of the AE is performed by storing information about application 2 in cseBaseCSE2/application2 resource as application 1 is registered with CSE 1. Application 1 communicates with application 2 via CSE 1 and CSE 2 instead of directly communicating with application 2. To this end, CSE 1 needs to be pre-registered with CSE 2. When CSE 1 registers with CSE 2, CSE 1 related information (e.g. Link) is stored in the form of <remoteCSE> resource lower than cseBaseCSE2 resource. That is, <remoteCSE> provides a CSE type, access address (IP address and the like), CSE ID, and reachability information about the registered CSE.

Resource discovery refers to a process of discovering resources present in a remote CSE. Resource discovery is performed through a retrieve request and the retrieve request for resource discovery includes the following.

<startURI>: this indicates a URI. The URI can be used to limit the range of resources to be discovered. If <startURI> indicates a resource root <cseBase>, resource discovery is performed on all resources of a receiver that has received the retrieve request. The receiver performs resource discovery only on a resource indicated by <startURI> and a lower resource thereof.

filterCriteria: this information describes information related to a resource to be discovered. The receiver searches the resources within a discovery range defined by <startURI> for a resource that satisfies filterCriteria and transmits the resource to a requester of the corresponding request.

The capability associated with the M2M service may provide the M2M common service function capable of being shared by a plurality of M2M network applications, and may open the M2M service through the open interface such that the M2M applications can use the M2M service. That is, the receiver acting as the entity for providing the service must support the service capability regarding a specific service requested by the entity acting as the originator requesting the service.

In case of Service Oriented Architecture (SOA), the SOA may provide a specific service using the service capability by which sharing and reuse are possible. In this case, the service capability may be constructed on the basis of a service or a component. In case of Resource Oriented Architecture (ROA), the ROA may provide the service capability through resource and attributes. As described above, the service capability may be implemented in different ways according to architecture categories. Therefore, assuming that the service capability discovery is applied to SOA, this means the process for searching for the service unit or the service component. In ROA, the above process may also indicate the process for searching for a specific resource or attributes.

For example, the service capability related to one embodiment of the present invention may be defined as a resource type, and various resource types shown in the following table are present.

TABLE 1

| Resource Type | Short Description | Child Resource Types | Parent Resource Types |
|---|---|---|---|
| CSEBase | The structural root for all the resources that are residing on a CSE. It shall store information about the CSE itself | remoteCSE, node, application, container, group, accessControlPolicy, subscription, mgmtObj, mgmtCmd, locationPolicy, statsConfig | None |
| group | Stores information about resources of the same type that need to be addressed as a Group. Operations addressed to a Group resource shall be executed in a bulk mode for all members belonging to the Group | fanOutPoint subscription | Application, remoteCSE, CSEBase |
| locationPolicy | Includes information to obtain and manage geographical location. It is only referred from container, the contentInstances of the container provides location information | subscription | CSEBase |
| remoteCSE | Represents a remote CSE for which there has been a registration procedure with the registrar CSE identified by the CSEBase resource | application, container, group, accessControlPolicy, subscription, mgmtObj, pollingChannel, node | CSEBase |
| subscription | Subscription resource represents the subscription information related to a resource. Such a resource shall be a child resource for the subscribe-to resource | schedule | accessControlPolicy, application, cmdhBuffer, cmdhDefaults, cmdhEcDefParamValues, cmdhDefEcValue, cmdhLimits, cmdhNetworkAccessRules, cmdhNwAccessRule, cmdhPolicy, container, CSEBase, delivery, eventConfig, execInstance, group, contentInstance, locationPolicy, mgmtCmd, mgmtObj, m2mServiceSubscription, node, nodeInfo, parameters, remoteCSE, request, schedule, statsCollect, statsConfig |
| container | Shares data instances among entities. Used as a mediator that takes care of buffering the data to exchange "data" between AEs and/or CSEs. | container, contentInstance, subscription, | application, container, remoteCSE, CSEBase |

Each resource type may be located below the parent resource type of the corresponding resource type, and may have a child resource type. In addition, each resource type may have attributes, and actual values may be stored in the attributes. Table 2 shows attributes of the <CSEBase> resource. The attributes used to store the actual values may always be set to the value of 1 through multiplicity or may be selectively set to the values ('0 . . . 1') through multiplicity. In addition, the corresponding attributes may be established according to RO (Read Only), RW (Read and Write), WO (Write Only) according to characteristics generated when the corresponding attributes are generated.

TABLE 2

| Attribute Name of <CSEBase> | Multiplicity | RW/RO/WO | Description |
|---|---|---|---|
| resourceType | 1 | RO | Resource Type. This Write Once (at creation time then cannot be changed) resourceType attribute identifies the type of resources. Each resource shall have a resourceType attribute. |
| creationTime | 1 | RO | Time/date of creation of the resource. This attribute is mandatory for all resources and the value is assigned by the system at the time when the resource is locally created. Such an attribute cannot be changed. |
| lastModifiedTime | 1 | RO | Last modification time/date of the resource. This attribute shall be mandatory and its value is assigned automatically by the system each time that the addressed target resource is modified by means of the UPDATE operation. |
| accessControlPolicyIDs | 0 . . . 1 (L) | RW | The attribute contains a list of identifiers (either an ID or a URI depending if it is a local resource or not) of an <accessControlPolicy> resource. |
| labels | 0 . . . 1 | RW | Tokens used as keys for discovering resources. This attribute is optional and if not present it means that the resource cannot be found by means of discovery procedure which uses labels as key parameter of the discovery. |
| cseType | 0 . . . 1 | WO | Indicates the type of CSE represented by the created resource. Mandatory for an IN-CSE, hence multiplicity (1). Its presence is subject to SP configuration in case of an ASN-CSE or a MN-CSE. |
| CSE-ID | 1 | WO | The globally unique CSE identifier. |
| supportedResourceType | 1 | RO | List of the resource types which are supported in CSE. This attribute contains subset of resource types listed in clause 9.2. For each supported resourceType this attribute indicates the supported optional attributes also. |
| pointOfAccess | 0 . . . 1 (L) | RW | Represents the list of physical addresses to be used by remote CSEs to connect to this CSE (e.g. IP address, FQDN). This attribute is used to announce its value to remote CSEs. |
| nodeLink | 0 . . . 1 | RO | A reference (URI) of a <node> resource that stores the node specific information. |

TABLE 2-continued

| Attribute Name of <CSEBase> | Multiplicity | RW/RO/WO | Description |
|---|---|---|---|
| notificationCongestionPolicy | 0 . . . 1 | RO | This attribute applies to CSEs generating subscription notifications. It specifies the rule which is applied when the storage of notifications for each subscriber (an AE or CSE) reaches the maximum storage limit for notifications for that subscriber. E.g. Delete stored notifications of lower notificationStoragePriority to make space for new notifications of higher notificationStoragePriority, or delete stored notifications of older creationTime to make space for new notifications when all notifications are of the same notificationStoragePriority. |

As shown in FIG. 5 or 6, the resource for use in the M2M system may be represented by a tree structure, and the root resource type may be denoted by <CSEBase>. Therefore, the <CSEBase> resource type must be present only when the common service entity (CSE) is present. Specifically, 'supportedResourceType' from among the <CSEBase> resource type attributes may be attributes for indicating the resource type and attributes capable of being supported by the corresponding entity. As can be seen from Table 2, since multiplicity is defined as the value of 1 in the 'supportedResourceType' information, the corresponding attributes are always present per CSE. The 'supportedResourceType' attributes are defined as follows.

supportedResourceType: This information may denote the list of resource types supported by CSE. This attribute may include a subset of the resource types enumerated in Table 1. In association with each supported resource type, this attribute may indicate optional attributes (List of the resource types which are supported in CSE. This attribute contains subset of resource types listed in clause 9.2. For each supported resourceType this attribute indicates the supported optional attributes also.)

As described above, the M2M system is designed on the basis of the ROA, such that information indicating whether the service capability is supported or not may be recognized through 'supportedResourceType' attributes contained in the <CSEBase> resource type.

The method for requesting specific service capability according to the related art will hereinafter be described with reference to FIG. 7. Entity 1 (71) may be an originator, or may be an AE or CSE. Entity 2 (72) may be a receiver or a CSE. Entity 1 and Entity 2 may assume that the registration procedure has been successfully completed in step S71. Entity 1 may transmit a request message associated with a specific capability to the entity 2 in step S72. The request message may be a request for generating the entity2/group resources. As a result, the entity 2 may perform the operation based on the above request, for example, may generate the entity2/group resource in step S73. Thereafter, entity 2 may transmit a response message to the above request to the entity 1, and the response message may include specific information indicating the success or failure.

Figure 7:
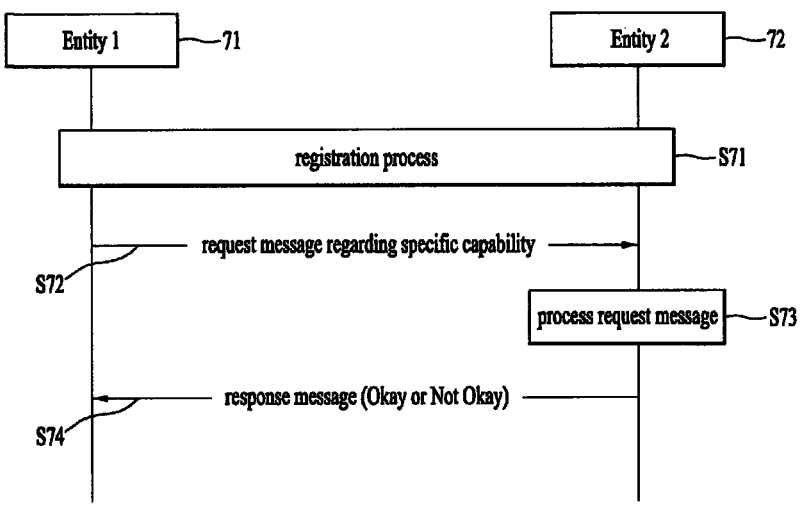
FIG. 7 is a flowchart illustrating a method for requesting a specific service according to the related art.

In the detailed description of FIG. 7, after completion of registration between the entities, the originator (i.e., entity 1) may request a specific service from the receiver (i.e., entity 2). Assuming that the receiver can support all capabilities requested by the originator, the service can be normally achieved. However, assuming that the receiver cannot support all the capabilities (i.e., assuming that the resource type related to the request message cannot be supported by the receiver), only there occurs a response message including the result indicating that the request message is not processed, and the originator cannot receive the above service.

In order to address the issues encountered when capabilities requested by the originator are not processed by the receiver, the entity capable of processing the requested capability is hierarchically discovered and the method for processing the request message is then proposed.

Embodiment(s) of the present invention will hereinafter be described. Although the embodiments of the present invention have exemplarily disclosed the M2M system environment for convenience of description, the scope of the present invention may also be applied to other systems having the client-server structure. In addition, as described above, the capability or the service capability may be represented through a specific resource type or attribute in the M2M system, the capability or the service capability for use in the embodiment(s) of the present invention may also be referred to as the resource type.

First Embodiment

The first embodiment may propose classification according to the position at which the resource type is additionally generated for the legacy resource type.

VD (Valid in only Designated entity): This resource type is only valid in the designated entity.

VA (Valid in All entity): This resource type is valid in all the entities including the designated entity.

The resource type may be classified into two kinds of resources according to the generation position of the corresponding resource type. First of all, this resource type is a resource type (i.e., VD) to be manipulated (created, retrieved, updated, deleted, notified) only in the entity (i.e., the receiver) designated as the originator. For example, a subscription resource in which the function for notifying the status change of the subscribed resource is a resource type that is only valid in a specific position designated by the originator. A resource type (i.e., VA) may not affect the function execution even when the above operation is performed in the remaining parts other than the entity designated by the originator. For example, the group resource for simultaneously transmitting the message to the arbitrarily established members may not affect the function execution even when such generation and utilization are achieved at the remaining parts other than the position designated by the originator. The classification of the above-mentioned defined resource type may be represented by the following table 3.

fully completed the registration procedure in step S801. In the present invention, the entity 1 or the entity 2 may denote devices corresponding to the M2M device, the M2M gateway, the M2M server, etc.

The entity 1 may transmit the request message regarding the specific capability to the entity 2 in step S802. In this case, the request message regarding the specific capability may be represented through a specific resource type (or attributes). In addition, the request message may include "op", "to", "fr", "mi", "cn", etc. Information contained in the request message may refer to FIG. 4.

The entity 2 may determine whether the resource type or attribute of the request message is supported or not in step S803. For example, if the request message is denoted by

TABLE 3

| Resource Type | Short Description | Child Resource Types | Parent Resource Types | Clarification |
|---|---|---|---|---|
| subscription | Subscription resource represents the subscription information related to a resource. Such a resource shall be a child resource for the subscribe-to resource | schedule | accessControlPolicy, application, cmdhBuffer, cmdhDefaults, cmdhEcDefParamValues, cmdhDefEcValue, cmdhLimits, cmdhNetworkAccessRules, cmdhNwAccessRule, cmdhPolicy, container, CSEBase, delivery, eventConfig, execInstance, group, contentInstance, locationPolicy, mgmtCmd, mgmtObj, m2mServiceSubscription, node, nodeInfo, parameters, remoteCSE, request, schedule, statsCollect, statsConfig | VD |
| group | Stores information about resources of the same type that need to be addressed as a Group. Operations addressed to a Group resource shall be executed in a bulk mode for all members belonging to the Group | fanOutPoint subscription | Application, remoteCSE, CSEBase | VA |
| locationPolicy | Includes information to obtain and manage geographical location. It is only referred from container, the contentInstances of the container provides location information | subscription | CSEBase | VD |
| container | Shares data instances among entities. Used as a mediator that takes care of buffering the data to exchange "data" between AEs and/or CSEs. | container, contentInstance, subscription, | application, container, remoteCSE, CSEBase | VA |

Second Embodiment

In accordance with the second embodiment, for the case in which it is impossible for the receiver to support the capability of the request message received from the originator, the receiver may perform the additional capability discovery process, and may generate the resource for processing the discovered entity.

Figure 8:
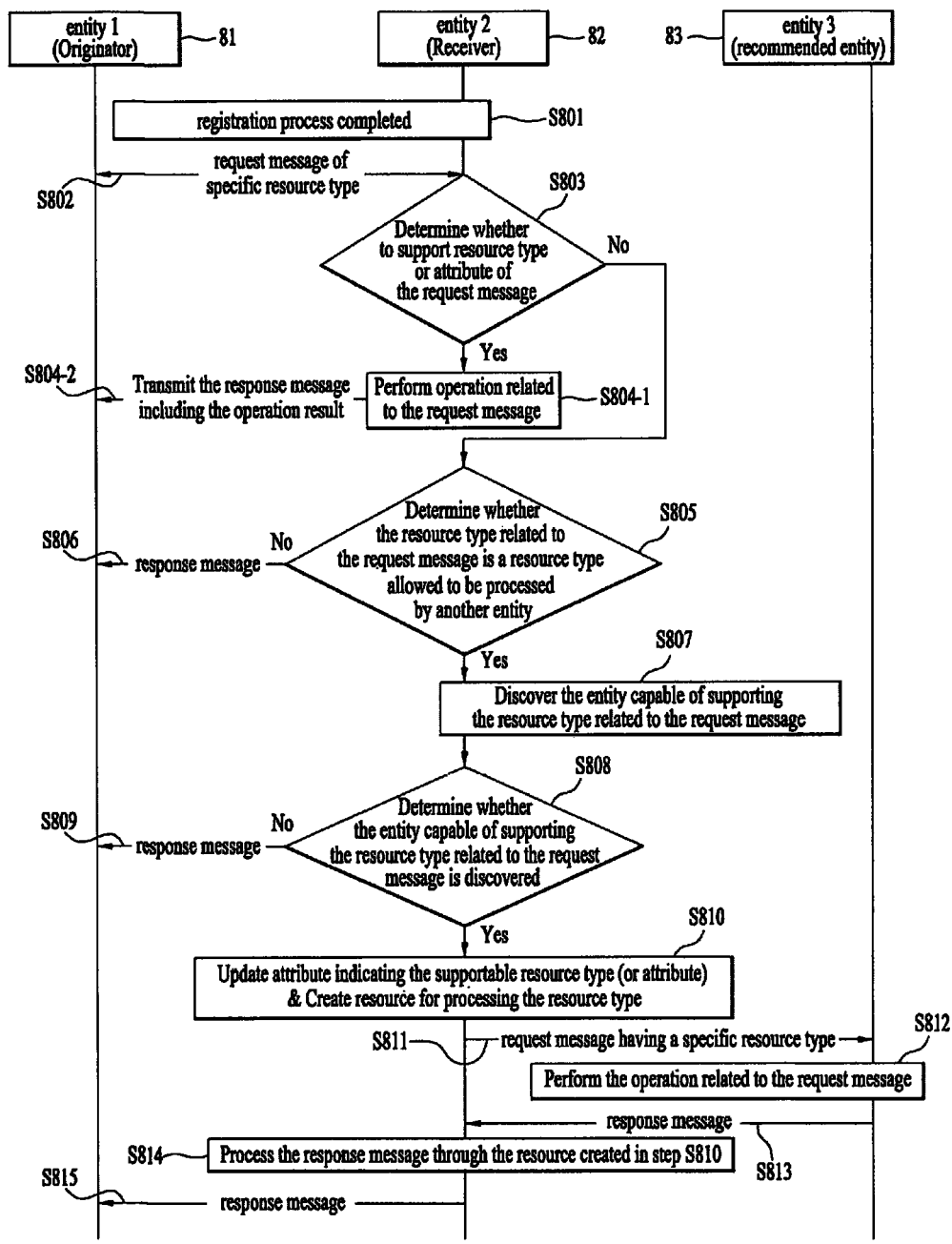
FIG. 8 is a flowchart illustrating a method for processing a specific request message according to an embodiment of the present invention.

FIG. 8 is a flowchart illustrating a method for processing a specific request message according to an embodiment of the present invention.

Referring to FIG. 8, it is assumed that Entity 1 (i.e., originator 81) and Entity 2 (i.e., receiver 82) have success- "Create entity2/group_A", the entity 2 may determine whether the group resource can be processed through the 'supportedResouceType' attributes contained in the CSE-Base resource of the entity 2.

Assuming that the entity 2 can support the resource type (or attributes) related to the request message received from the entity 1, the operation related to the request message can be carried out in step S804-1. The entity 2 may transmit the response message including the above-mentioned operation result to the entity 1 in step S804-2. If the above-mentioned operation is successfully completed, the procedure of the embodiment is terminated.

Assuming that the entity 2 cannot support the resource type (or attributes) related to the request message received from the entity 1, it can be determined whether the resource type related to the request message is a resource type (e.g., VA) to be processed in another entity other than the entity (e.g., entity 2) designated by the entity 1 in step S805. As described above, since the resource type in ROA may have different meanings according to the generation position, the entity 2 may first determine the above situation before discovering the arbitrary entity supporting the resource type related to the request message.

Assuming that the entity 2 cannot support the resource type related to the request message received from the entity and the resource type related to the request message must be additionally performed in the entity 2, the entity 2 may transmit the response message indicating that the operation related to the request message is not performed, to the entity 1 in step S806. In this case, the procedures for use in the embodiment are then terminated.

Assuming that the resource type related to the request message is a resource type to be processed in another entity, the entity 2 may search for or discover the entity capable of supporting the resource type related to the request message received from the entity 1 in step S807. Detailed description of the above entity discovery will be described later with reference to FIG. 9.

The entity 2 may determine whether the entity capable of supporting the resource type related to the request message is discovered according to the discovery result in step S808. If the entity capable of supporting the resource type is not discovered during the above discovery process, the response message including information indicating the above situation may be transmitted to the entity 1 in step S809, and the procedure of the above embodiment is then terminated.

If the entity (i.e., entity 3 (83)) capable of supporting the above resource type is discovered, the entity 2 may update the attributes (e.g., 'supportedResourceType' attributes) indicating the resource type (or attributes) capable of being supported by the entity 2, and may generate the resource for processing the resource type in step S810.

For example, if the request message is denoted by "Create entity2/group_A" (this is a request for generating a resource (group_A) in the entity 2), the resource type related to the request message is a group. In this case, if the entity 2 does not support the resource type (group), the entity 3 may be discovered in step S807. The entity 2 may update the corresponding attribute value to support the group resource type for 'supportedResourceType' attributes. The above updating may be achieved by adding the Virtual_Supported_Resource='group' to the 'supportedResourceType' attributes. As a result, although the above-mentioned operation is not directly supported, the entity capable of supporting the corresponding resource type may be recognized. In addition, the entity 2 may generate the group A of the resource type (unsupportedResourceType) in such a manner that the entity 3 capable of supporting the group resource type can process the corresponding request message.

If a request for unsupported resource type is present, "unsupportedResourceType" is a resource type to solve the request. If the entity capable of supporting the corresponding resource type through the discovery procedure is discovered, the entity 2 may generate 'targetResource' attributes of the unsupportedResourceType in the group_A resources, and the 'targetResource' attribute may have a value for indicating the actual target of the above request. For example, assuming that the entity capable of supporting the group resource type is the entity 3, the 'targetResource' attribute may have the ID of the entity 3 as the corresponding value.

The 'targetResource' attribute may be used when the entity 2 receives the request related to the group resource type from another entity. For example, upon receiving the request related to the group resource type from the entity X, the entity 2 may confirm the entity (i.e., entity 3) indicated by the 'targetResource' attribute without a separate discovery procedure, may process the above request and transmit the processed result to the corresponding entity.

The entity 2 may process the request message received from the entity 1 such that the entity 3 can receive the request message. Thereafter, the entity 2 may transmit the processed request message to the entity 3 in step S811. In this case, the processing of the above request message may be achieved through the generated resource (i.e., group_A resource contained in the entity 2), and "to" from among information of the request message may be changed to the address (e.g., URI) of the resource generated in step S810, and "fr" may be changed to the ID of the entity 2. In this case, if several request messages related to the resource generated in step S810 are present in step S810, "ri" from among information of the request message may be used to identify each request message.

The entity 3 may support the resource type related to the request message received from the entity 2, such that the operation related to the corresponding request message may be performed in step S812. For example, the entity 3 may generate the entity3/group_A resource in the CSE.

Upon completion of the operation related to the request message, the entity 3 may transmit the response message including the operation result to the entity 2 in step S813. In this case, "to" of the response message may indicate the address (e.g., URI) generated in step S810. In this case, if several request messages related to the resource generated in step S810 are present, "ri" from among information of the request message may be used to identify each request message.

The entity 2 may process the corresponding response message in such a manner that the response message received from the entity 3 can be received by the entity 1 in step S814. In this case, the processing of the response message may be achieved through the resource generated in step S810, and 'to' from among the response message may be changed to the ID of the entity 1, and 'fr' may be changed to the address (e.g., URI) of the resource generated in step S810.

The entity 2 may transmit the processed response message to the entity 1 in step S815, and may terminate all the steps.

In the meantime, steps (S801 to S814) shown in FIG. 8 may be performed in another order different from those in steps (S801 내지 S814). For example, according to the entity discovery procedure (or some parts thereof) related to steps S807 and S808, the entity 2 (e.g., prior to step S801) is performed in advance, and the entities supporting the resource type is recognized. When the entity 2 does not support the capability (or resource type) related to the request message, one of the corresponding entities may be selected.

Third Embodiment

In the embodiment related to FIG. 8, assuming that the resource type related to the request message is a resource type to be processed in another entity, the entity 2 may search for or discover the entity capable of supporting the resource type related to the request message received from the entity 1. A detailed description thereof will hereinafter be described with reference to FIGS. 9 and 10.

Figure 9:
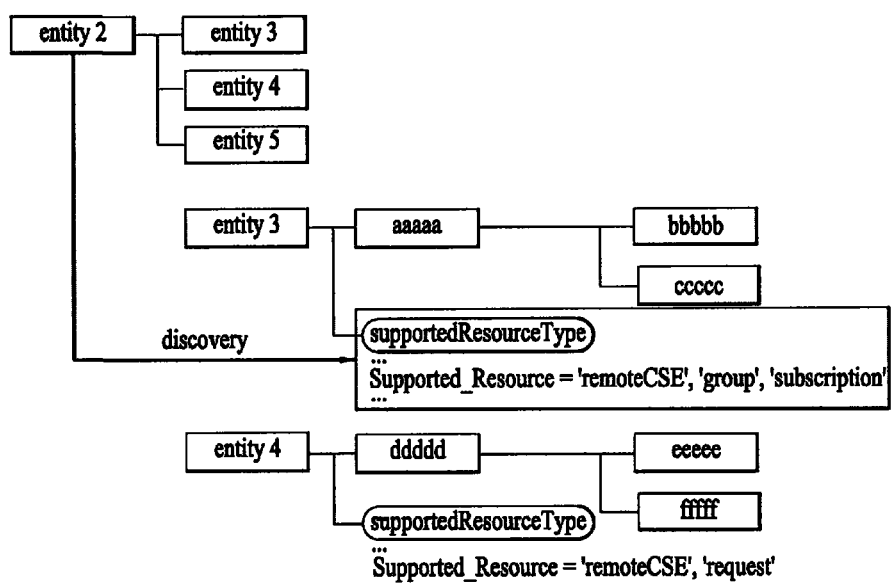
FIG. 9 is a conceptual diagram illustrating a method for searching for an entity capable of supporting the resource type related to a request message according to an embodiment of the present invention.

FIG. 9 is a conceptual diagram illustrating the case in which the entity 2 (i.e., receiver) recognizes the entity supporting the capability (or resource type) related to the request message. In this case, the entity 2 may determine whether at least one entity can support the capability (or resource type) related to the request message through the discovery procedure related to at least one entity registered in the entity 2.

The entity 2 may register the entity 3, the entity 4, and the entity 5. As described above, all the resource types capable of being supported by the corresponding entity and the attribute may be stored as the <supportedResourceType> attribute value located below all the CSEs. Therefore, the entity 2 may confirm the <supportedResourceType> attribute values of the entities registered in the entity 2, and may search for or discover the entity configured to support the resource type and attribute of the request message received from the entity 1.

However, in order to successfully perform the discovery process, the right for reading the <supportedResourceType> attribute value of the entity in which the entity 2 is registered is needed. Therefore, the process for authenticating the above right must be performed in advance. In addition, the entity 2 must perform the operation related to the capability (or the resource type) associated with the request message with respect to the entity (i.e., a candidate entity) discovered through the above discovery process, such that the entity 2 must determine whether the request message received from the entity 1 has the right to perform the above request message, instead of the entity 1.

For example, if the entity 2 assumes that the request message received from the entity 1 is denoted by "Create entity2/group_A", the operation for confirming the above right may include the first right ① and the second right ②. The first right ① indicates that the entity 2 reads the <supportedResourceType> attribute of another entity registered in the entity 2. The second right ② indicates that the entity 2 can create the group resource in the candidate entity.

Figure 10:
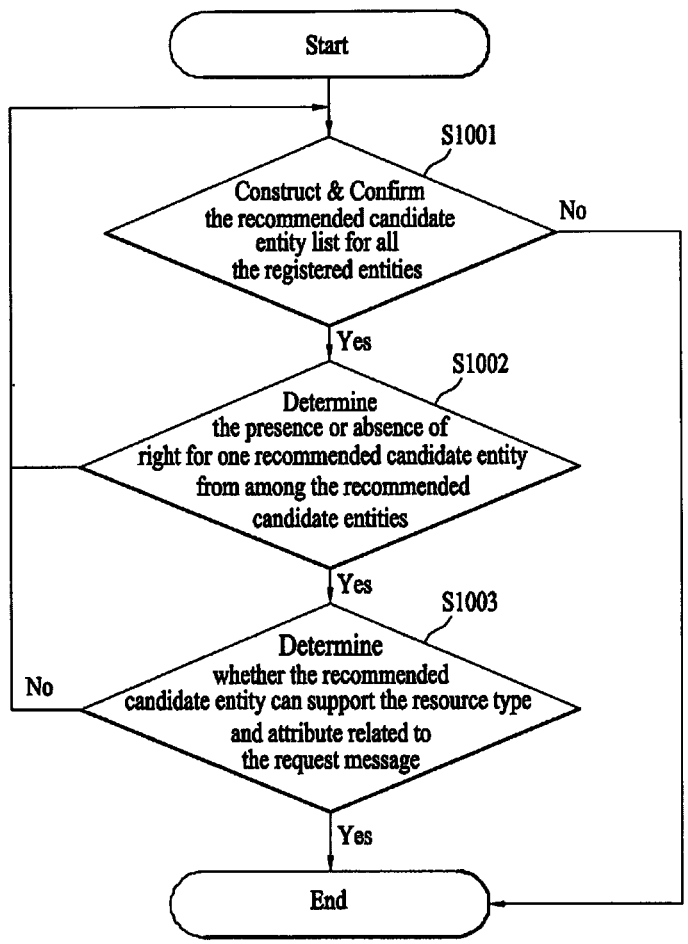
FIG. 10 is a flowchart illustrating an entity searching procedure according to an embodiment of the present invention.

FIG. 10 is a flowchart illustrating the entity discovery procedure according to an embodiment of the present invention.

Referring to FIG. 10, the entity 2 may construct the list of recommended candidate entities for all the entities registered in the entity 2 in step S1001. The entity 2 may determine the presence or absence of an entity capable of performing the discovery procedure. If the entity is not present, the above discovery procedure is terminated.

The entity 2 may determine whether a specific right is present in one recommended candidate entity from among the plurality of recommended candidate entities in step S1002. The operation for confirming the presence or absence of such right may include confirming two authorities. If the presence of the right for the recommended candidate entity is not confirmed, this procedure returns to step S1001, such that the corresponding procedure for another entity contained in the recommended candidate entity list is performed. In addition, the entity (i.e., the first entity) that has completely performed the right confirmation process together with the entity 2 may be excluded from the list of the recommended candidate entity list.

The entity 2 may determine whether the recommended candidate entity can support the resource type and attributes related to the request message from the entity 1 in step S1003. If the recommended candidate entity cannot support the resource type and attribute, this procedure returns to step S1001 such that the corresponding procedure for another entity contained in the recommended candidate entity list can be carried out.

Meanwhile, although the procedure shown in FIG. 10 will be terminated only when only one entity supporting the resource type and attribute is discovered, the above discovery procedure is performed for all the entities registered in the entity 2, and the list of recommended entities can then be acquired.

In the meantime, the entity discovery procedure used when the entity capable of supporting the capability (or resource type) related to the request message is not recognized by the entity 2 (i.e., receiver) will hereinafter be described. In this case, the entity 2 may request the capability discovery from the registered entities, and the entities registered in the entity 2 can determine whether the capability (or resource type) related to the request message can be supported through the discovery process related to the registered entities. That is, the entity 2 may indirectly determine whether the capability of the request message is supported through the registered entities. In this case, the discovery procedure related to the registered entities may be identical to those of the above-mentioned embodiments shown in FIGS. 9 and 10.

Figure 11:
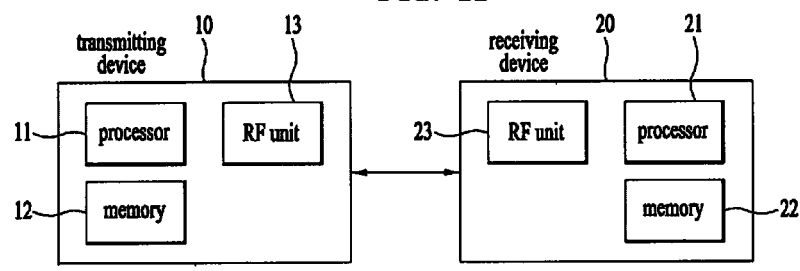
FIG. 11 is a block diagram of an apparatus for implementing embodiment(s) of the present invention.

FIG. 11 is a block diagram of a transmitting device 10 and a receiving device 20 configured to implement exemplary embodiments of the present invention. Referring to FIG. 11, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

In the embodiments of the present invention, application (entity) or resource related entity etc. may operate as devices in which they are installed or mounted, that is, a transmitting device 10 or a receiving device 20.

The specific features of the application (entity) or the resource related entity etc. such as the transmitting device or the receiving device may be implemented as a combination of one or more embodiments of the present invention described above in connection with the drawings.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a base station, a server, or other apparatuses.

The invention claimed is:

1. A method for processing a request message by a first machine-to-machine (M2M) device in a wireless communication system, comprising:
receiving a request message related to a specific resource type from a second M2M device;
determining whether the specific resource type is supported;
if the specific resource type is not supported, discovering another M2M device supporting the specific resource type;
if a third M2M device supporting the specific resource type is discovered according to the discovery result, processing the request message and transmitting the processed request message to the third M2M device, wherein an operation related to the request message is performed by the third M2M device instead of the first M2M device;
receiving a response message including a result of processing the request message from the another M2M device; and
processing the received response message, and transmitting the processed response message to the second M2M device.

2. The method according to claim 1, wherein the determining whether the specific resource type is supported includes:
determining whether the specific resource type is contained in a value of 'supportedResourceType' attribute contained in a <CSEBase> resource.

3. The method according to claim 1, further comprising:
prior to the discovering, determining whether the specific resource type is a resource type allowed to be processed by another device other than a device designated by the second M2M device.

4. The method according to claim 1, wherein the discovering includes:
determining whether the first M2M device has a specific right for the third M2M device; and
if the specific right for the third M2M device is present, determining whether the third M2M device supports the specific resource type.

5. The method according to claim 4, wherein the determining whether the first M2M device has a specific right for the third M2M device includes:
determining the presence or absence of the specific rights based on a first right in which the first M2M device is allowed to read 'supportedResourceType' attribute contained in the resource of the third M2M device or a second right in which the first M2M device is allowed to perform an operation related to the request message to the third M2M device.

6. The method according to claim 1, further comprising:
if the third M2M device supporting the specific resource type is discovered according to the discovery result, including the specific resource type in the 'supportedResourceType' attribute contained in <CSEBase> resource.

7. The method according to claim 1, further comprising:
if the third M2M device supporting the specific resource type is discovered according to the discovery result, before transmitting the processed request message to the third M2M device,
generating a resource having a specific resource type ('unsupportedResourceType').

8. The method according to claim 7, wherein the processed request message, the response message, and the processed response message include information regarding an address of a resource having the specific resource type.

9. A machine-to-machine (M2M) device configured to process a request message in a wireless communication system, comprising:
a radio frequency (RF) unit; and
a processor configured to control the RF unit,
wherein the processor receives a request message related to a specific resource type from a second M2M device, determines whether the specific resource type is supported, if the specific resource type is not supported, discovers another M2M device supporting the specific resource type, if a third M2M device supporting the specific resource type is discovered according to the discovery result, processes the request message and transmits the processed request message to the third M2M device, performs an operation related to the request message by the third M2M device instead of the first M2M device; receives a response message including a result of processing the request message from the another M2M device; and processes the received response message, and transmits the processed response message to the second M2M device.

10. The M2M device according to claim 9, wherein the processor determines whether the specific resource type is contained in a value of supportedResourceType attribute contained in a <CSEBase> resource so as to determine whether the specific resource type is supported.

11. The M2M device according to claim 9, wherein the processor,
prior to the discovering, determines whether the specific resource type is a resource type allowed to be processed by another device other than a device designated by the second M2M device.

12. The M2M device according to claim 9, wherein the processor determines whether the first M2M device has a specific right for the third M2M device; and if the specific right for the third M2M device is present, determines whether the third M2M device supports the specific resource type.

13. The M2M device according to claim 12, wherein whether the first M2M device has a specific right for the third M2M device is determined based on a first right in which the first M2M device is allowed to read 'supportedResourceType' attribute contained in the resource of the third M2M device or a second right in which the first M2M device is allowed to perform an operation related to the request message to the third M2M device.

14. The M2M device according to claim 9, wherein:
if the third M2M device supporting the specific resource type is discovered according to the discovery result, the processor includes the specific resource type in the 'supportedResourceType' attribute contained in a <CSEBase> resource.

15. The M2M device according to claim 9, wherein:
if the third M2M device supporting the specific resource type is discovered according to the discovery result, before transmitting the processed request message to the third M2M device, the processor generates a resource having a specific resource type ('unsupportedResourceType').

16. The M2M device according to claim 15, wherein the processed request message, the response message, and the processed response message include information regarding an address of a resource having the specific resource type.

* * * * *